United States Patent [19]

Portfolio et al.

[11] Patent Number: 5,364,894
[45] Date of Patent: Nov. 15, 1994

[54] EMULSIFICATION OF ASPHALT AND MODIFIED ASPHALT WITH PRIMARY EMULSIFIER POLYMERS COMPRISED OF ACRYLIC ACID TYPE MONOMERS

[75] Inventors: Donald C. Portfolio, Solon; Fred A. Fensel, Shaker Heights, both of Ohio

[73] Assignee: Tremco, Inc., Beachwood, Ohio

[21] Appl. No.: 40,782

[22] Filed: Mar. 31, 1993

[51] Int. Cl.⁵ .............................................. C08L 95/00
[52] U.S. Cl. ........................................ 524/60; 524/69; 106/277
[58] Field of Search .................... 524/60, 69, 522, 523, 524/560, 561, 562, 556; 106/277

[56] References Cited

U.S. PATENT DOCUMENTS

| | | | |
|---|---|---|---|
| 2,972,588 | 2/1961 | Cohen | 524/60 |
| 3,652,482 | 3/1972 | Burke, Jr. | 523/318 |
| 3,915,921 | 10/1975 | Schlatzer, Jr. | 524/916 |
| 4,509,949 | 4/1985 | Huang et al. | 526/318.3 |
| 4,654,385 | 3/1987 | Roberts et al. | 524/69 |
| 4,772,647 | 9/1988 | Grossi et al. | 524/69 |
| 4,812,327 | 3/1989 | Hanazawa et al. | 524/60 |
| 5,019,610 | 5/1991 | Sitz et al. | 524/68 |

FOREIGN PATENT DOCUMENTS

| | | | |
|---|---|---|---|
| 2376188 | 7/1978 | France. | |
| 0149373 | 7/1981 | Germany | 524/60 |

OTHER PUBLICATIONS

Exhibit A, Trade literature Carbopol ® 1622, published Apr. 1992, by BF Goodrich, Brecksville, Ohio.
Exhibit B, Trade literature Carbopol ® Polymers, published May, 1992, by BF Goodrich, Brecksville, Ohio.
Exhibit C, Trade literature Carbopol ®, published Aug., 1988, by BF Goodrich, Brecksville, Ohio.
An article entitled "Differences Between Petroleium Asphalt, Coal-Tar Pitch and Road Tar" by V. P. Puzinaukas and L. W. Corbett, *Research Report 78-1*, Jan., 1978, The Asphalt Institute, College Park, Md.

*Primary Examiner*—Peter Szekely
*Attorney, Agent, or Firm*—David P. Dureska; Samuel B. Laferty

[57] ABSTRACT

Emulsions of asphaltic materials, such as asphalt or asphalt blends with polymers, in water using copolymeric anionic emulsifiers are disclosed. The copolymeric anionic emulsifiers use ionizable carboxyl groups as their hydrophilic moiety. The emulsions using these copolymeric emulsifiers are stable, allowing them to be used anywhere where asphalt or modified asphalt is used as a sealant, coating, or binder. These emulsions can also be mixed with polymer latices, pigments, fibers, fillers and other additives to impart particular properties specific to the type of application, i.e., pigmented flexible coating compositions, non-sag sealer and sealant compositions, water borne adhesive compositions, etc., for use in construction and industrial fields. These asphalt emulsions have better freeze-thaw stability, higher solids contents, and wider applicability to polymer modified asphalt compositions than prior art emulsions.

27 Claims, No Drawings

EMULSIFICATION OF ASPHALT AND MODIFIED ASPHALT WITH PRIMARY EMULSIFIER POLYMERS COMPRISED OF ACRYLIC ACID TYPE MONOMERS

FIELD OF INVENTION

The present invention relates to asphaltic compositions in the form of aqueous emulsions of asphalt or modified asphalt with a copolymeric anionic emulsifiers where the hydrophilic group is the ionizable carboxyl group from a carboxylic acid monomer. The resultant product is an economical emulsion for a wide variety of commercial coating, sealing, and binding applications. The asphaltic compositions have wide potential use in construction and industrial applications as coatings, waterproofing agents, and adhesives.

BACKGROUND

Asphalt is manufactured by a variety of methods producing types and grades of different specifications. The properties range from soft and flowable to hard and brittle. They have found uses in coating, sealing, and adhesive applications in construction and industrial applications. These materials are thermoplastic in nature, that is, they need to be heated above their melting point in order to be applied. Various technologies have been developed to circumvent the practice of heating for application. They involve placing the asphalt in a fluid media, or vehicle, allowing the their application without the necessity of heating. They solidify or cure through the elimination, in most cases by evaporation, of the vehicle. The two most common vehicles are solvents and water.

The use of solvents requires solubility of the asphalt in the solvent, most often petroleum distillates are used as solvents. They produce blends that are commonly referred to as cut backs or road oils. They vary in viscosity and cure rate depending on the type of base asphalt, type of solvent, and composition.

The use of water as the fluid media requires the use of surface active agents (emulsifiers). This mixture produces a dispersion commonly called an emulsion. Asphalt emulsions consists of two types, those in which the asphalt is dispersed in an external phase which is water, and those in which the water is dispersed in the external phase which is asphalt.

Asphalt in water emulsions use surface agents that can be classified as anionic, cationic, and nonionic types. The dispersed phase of anionic and cationic types are charged while nonionics neither carry nor impart any charge. Anionic emulsions are produced from a variety of materials such as soaps of fatty acids and oils (oleic acid, tall oil), alkali soaps, metallic soaps, rosin soaps, and caseins. Cationic emulsifiers are produced from quaternary nitrogen compounds while non-ionic emulsifiers are produced from esters of alcohols such as glycol mono, di, and tri-laurates.

Water in asphalt emulsions use surface active agents that can be classified as oil soluble, inorganic powder, and non-soap types. Emulsions produced using oil soluble compounds utilize the solubility of the compounds in the external phase, which is asphalt in this case. Examples of these types of materials are lead tallate, calcium naphthenate, and other similar heavy metal salts of fatty acids such as fish oil acids, crude soya acids, petroleum sulfonic acids, etc. Emulsions produced using inorganic materials are based on the fact that they act as dispersants for water. Examples of the inorganic type are mainly fined powdered clays, preferably chemically modified clays, the most important being bentonite. Bentonite clay forms extremely colloidal gelatinous mixtures yielding asphalt dispersions of very small particle size. The clay is very hygroscopic in nature, holding water tenaciously bringing it into dispersion within the asphalt. Emulsions of this type are commonly referred to as clay emulsions. Examples of nonsoap types of materials are tannins, hydrous oxides, metallic hydroxides, lignins and alginates. Asphalt emulsions are discussed in Barth, *Asphalt, Science and Technology*, Gordon and Breech: New York, 1968, Chapter 7.

The choice of the above-described asphalt emulsions is dependant upon its particular application. The asphalt in water type are used in industrial applications and extensively in construction applications, predominately pavement construction and sealing. Cationic emulsions typically cure rapidly and often perform well with mixtures of aggregate, especially those with electronegatively charged surfaces. It is because of these reasons these cationic types are used almost exclusively in paving applications. Their drawback is that they have poorest storage stability in terms of settling and particle coalescence and that aggregation often cannot be reversed with agitation. Because of their charge, they are generally not compatible with fibers, fillers, or other particle type additives.

Anionic emulsions, on the other hand, are generally slower curing, have better storage stability (three to six months), and are compatible with fibers, fillers and other additives. Anionic emulsions having this type of versatility are often compounded with additives and used as coatings, sealants, crack fillers, adhesives in construction and industrial applications. Non-ionic asphalt emulsions are not common. These asphalt in water emulsions typically have asphalt solids of thirty to sixty five percent, the anionics generally being higher. These emulsions "break" or undergo the phenomena of irreversible particle coalescence, when subjected to a single freeze thaw cycle.

The water in asphalt type emulsions are used extensively in construction as paving sealers and water/-damp-proofing materials, and, in industrial applications, such as roofing, as coatings and mastics. The most common of these types of asphalt emulsions are clay stabilized emulsions. These emulsions can vary in asphalt solids concentration depending on the application, but are generally in the range of forty five to fifty five wt. percent. One of the most unique characteristics of the clay emulsion is its theology, it can be described as plastic fluid displaying a distinct yield value. This property imparts non-sag characteristics which are unique. It ideal for the sloped roofing application or the vertical damp-proofing foundation application. The emulsion is extremely stable having shelf lives of two years or more and is compatible with a wide range of polymer latices, fibers, fillers, and other particulate additives. The emulsion will generally break when subjected to a freeze thaw cycle; however, it is a common practice for the addition of a glycol, to act as an antifreeze, imparting the tolerance for a few freeze thaw cycles.

The use of emulsions as compared to asphalt cutbacks is becoming increasingly popular as the product of choice for the non-heated applications. This is because of the dangers and hazards of solvent containing compositions to the environment and hazards with employee exposure to solvent in manufacturing and application. Storage stability, freeze thaw stability, limited compatibility with auxiliary additives, and low binder (asphalt solids) contents are deficiencies in current asphalt emulsions which hinder and often restrict their use.

SUMMARY OF THE INVENTION

Asphaltic compositions can be emulsified with copolymeric anionic emulsifiers where the hydrophilic group is the ionizable carboxyl group of a carboxylic acid type monomer. These asphaltic emulsions are capable of withstanding a large number of freeze thaw cycles and can achieve higher solids contents on the order of seventy five percent. They are compatible with polymer latices as well as a wide range of fibers, fillers, and other additives, allowing them versatility to be compounded in many ways for specific product applications. The viscosity of these emulsions can be modified with small changes in pH. The copolymeric anionic emulsifiers are desirably copolymers containing acrylic acid monomers.

DETAILED DESCRIPTION OF THE INVENTION

Asphaltic compounds can be emulsified in water at high solid concentrations using polymeric anionic emulsifiers made from carboxylic acid monomers. These emulsifiers result in very stable emulsions that can be stored for extended periods without breakdown and can withstand freezing and thawing cycles which destabilize other anionically stabilized emulsions. The high solids content allows sealants based on these emulsions to set up quickly after application such that wash-off or run-off of the asphalt compounds is less of a problem.

The amount of these emulsifiers in these emulsions made from carboxylic acid monomers can be from about 0.05 to about 7 weight percent, desirably from about 0.1 to about 3 or 4 weight percent, and preferably from about 0.1 to about 1 or 2 weight percent. Water is present from about 20 to about 80 weight percent, and desirably from about 23 to about 40 or 50 weight percent. The asphaltic compounds can be present from about 20 to about 80 weight percent, desirably from about 50 to about 77 weight percent, more desirably from about 60 to about 75 weight percent, and preferably from about 65 or 66 to about 75 weight percent.

The copolymeric emulsifiers of this invention having comonomers of acrylates, whose ester group has from 10 to 30 carbon atoms, do not require an organic amine having at least six carbon atoms to function as primary emulsifiers. As the polymeric emulsifiers of this embodiment do not require neutralization with an organic amine, they can be used at lower pH and viscosity. This facilitates increasing the amount of asphalt in the emulsion, often reaching about 75 weight percent solids. The copolymeric anionic emulsifiers of this embodiment can be the sole emulsifier for the described asphaltic emulsions.

The emulsifiers can be a copolymer from one or more carboxylic acid monomers and one or more olefinic comonomers, which comonomers do not have the carboxylic acid functional group. The emulsifier desirably also contains one or more crosslinking monomers.

The carboxylic acid monomers of this invention are olefinically unsaturated carboxylic acids containing at least one activated carbon-to-carbon double bond and at least one carboxyl group, that is, an acid containing an olefinic double bond which readily functions in polymerization because of its presence in the monomer molecule either in the alpha-beta position with respect to a carboxyl group,

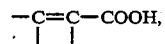

or as a part of a terminal methylene grouping

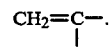

Olefinically-unsaturated acids of this class include such materials as acrylic acid, methacrylic acid, ethacrylic acid, alpha-chloro-acrylic acid, maleic acid, and fumaric acid. These monomers generally have from 3 to 20 carbon atoms and can be substituted with various alkyl, aryl, halogen, alkylaryl cyano, and halogenated alkyl groups. As used herein, the term carboxylic acid includes polycarboxylic acids and their anhydrides, such as maleic anhydride, wherein the anhydride is formed by the elimination of one molecule of water from two carboxyl groups located on the same polycarboxylic acid molecule. The preferred carboxylic acid monomers are the acrylic acids having the general structure

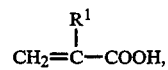

wherein $R^1$ is a substituent selected from the class consisting of hydrogen, halogen, cyanogen (—C≡N), monovalent alkyl radicals of 1 to 10 carbon atoms, and preferably $R^1$ is H, $CH_3$, or $C_2H_5$. The amount of carboxylic acid monomers in the copolymeric emulsifier can be from about 50 to about 99 weight percent, desirably from about 50 to about 98 weight percent, and preferably from about 70 or 88 to about 95 weight percent.

The olefinic comonomers in these polymers which do not have carboxylic acid or anhydride functional groups are generally olefins, including diolefins and substituted olefins, having from 2 to 35 carbon atoms. The substituents can include one or more alkyl, aryl, alkyaryl, halogens, cyano, halogenated alkyl groups, esters, amides, etc. The substituted olefins thus include acrylamides, acrylates, acrylonitriles, vinyl acetates, styrene, and substituted versions of these listed monomers. The preferred olefinic comonomers which do not have carboxylic acid or anhydride functional groups are acrylates of the formula

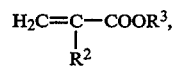

wherein $R^3$ is an alkyl group having from 10 to 30 carbon atoms, preferably 12 to 22 carbon atoms, while $R^2$ is hydrogen, $CH_3$, or $C_2H_5$. The preferred amounts of the acrylates of the above formula is from about 1 to about 50 and desirably from about 2 to about 5, 10 or 29.5 weight percent. These olefinic monomers need to be polymerizable through their carbon-to-carbon double bond as described for the carboxylic acid monomers. The amount of these olefinic comonomers other than the acrylates of the above formula in a copolymer can be up to 49 weight percent, desirably from about 1 to about 49 weight percent, and preferably from about 2 or 4 to about 29.5 weight percent.

These copolymeric emulsifiers made from carboxylic acid monomers can be crosslinked by including crosslinking agents (monomers) having at least two unsaturated carbon-to-carbon double bonds which each are capable of being copolymerized with the carboxylic acid monomers and the olefinic comonomers, for example, butadiene, isoprene, divinyl benzene, divinyl naphthalene, allyl acrylates, and the like. Also useful as crosslinking agents are polyalkenyl polyethers made from reacting more than one alkenyl halide, such as allyl chloride or allyl bromide, with a strongly alkaline aqueous solution of one or more polyhydric alcohols. These products include allyl pentaerythritol, trimethylol propane diallylether, and allyl sucrose. Efficiency of the polyether crosslinking agent increases as the number of polymerizable groups on the polyether increases. Other crosslinking agents include diallyl esters, allyl or methallyl acrylates and acrylamides, tetraallyl tin, tetravinyl silane, diacrylates, divinyl compounds, etc. The amount of these crosslinking agents in a copolymer can be up to 6 weight percent, desirably from about 0.1 to about 4 weight percent, and preferably from about 0.5 to about 4 weight percent.

The copolymers from carboxylic acid monomers useful for this invention desirably have average molecular weights from about 60,000 to about 15,000,000, more desirably from about 450,000 to about 8,000,000, and preferably from about 1,500,000 to about 4,500,000.

The polymerization of the copolymeric emulsifier from the monomers is usually carried out in the presence of a free radical catalyst in a closed vessel in an inert atmosphere. The temperature of the polymerization may be varied from about 0° to 125° C. or lower or higher, yielding 75 to 100 percent polymer. The catalysts include peroxygen compounds such as persulfates, peroxides, perbenzoates, etc. as well as azo compounds such as azobisisobutyronitrile, reduction oxidation initiator systems, and U.V. activated initiators.

The polymerizations may be conducted in an inert liquid media having some solubilizing effect on one or more of the monomeric ingredients, but substantially no solubilizing effect on the resulting polymer. Such materials are nonsolvents for the copolymer and include hydrocarbons containing 1 to 8 carbon atoms such as benzene, hexane, cyclohexane, carbon tetrachloride, chloroform, esters such as methyl acetate, and alcohols such as methyl, ethyl, and butyl alcohol. The inert liquid media can desirably be from about 50 to about 99 weight percent of the polymerization recipe.

Other details of preparing such polymers and copolymeric emulsifiers are given in U.S. Pat. Nos. 3,915,921 and 4,509,949, which are hereby incorporated by reference.

Asphalts within the scope of the present invention include both natural and manufactured asphalts specifically excluding tars and pitches. Tars and pitches have higher aromatic contents than asphalts, are soluble in different solvents, are easier to emulsify, and are less environmentally acceptable than asphalts.

Natural asphalts can be identified as to their native source. They usually contain organic impurities. Known deposits of lake asphalts are Trinidad and Bermudez in Venezuela. Rock asphalts in deposits are found in the United States and Europe, they exist as impregnated sandstones or limestones. Asphaltites are solid natural asphalts which include gilsonite, grahamite, and glance pitch.

Manufactured asphalts are derived from vacuum and/or steam distillation of petroleum crude oils. They may also be obtained from the distillation and/or refining of liquid residues obtained as by-products from oil-cracking processes. These manufactured asphalts can be further refined by the process of blowing oxygen containing gases into the material or by solvent extraction.

The asphalts may optionally be modified with various hydrocarbon process oils derived from petroleum or coal refining operations. This is done to impart the particular asphalt compatibility for substrate adhesion. The process oil may also be added optionally as a post addition after the emulsion is formed.

The asphalt can be chemically modified asphalt (CMA) as prepared by the process described in U.S. Pat. No. 4,419,489, which is hereby incorporated by reference, utilizing generally the ingredients described therein. Therein, the CMA is prepared by reacting an asphalt, a vinyl monomer, one or more elastomers, and an acrylamide for an extended period of time, on the order of 300° F. to 400° F. (149°–204° C.) under reflux. Suitable vinyl monomers include vinyl aromatic monomers such as styrene. Suitable elastomers include natural rubber and synthetic rubber. Suitable are synthetic rubbers which are polymers of conjugated diene (e.g., butadiene, isoprene, chloroprene, etc.), copolymers of one or more conjugated dienes with ethylenic monomers, as well as various polymers which are substituted with a functional group containing a labile hydrogen atom. Examples include various hydroxy, amino, and like substituted homopolymers of conjugated dienes. Included are butadiene-styrene rubbers, butadiene-acrylonitrile rubbers, etc. Also included are hydroxy terminated versions of these copolymers.

The elastomers may also be block copolymers of at least two mono-alkenyl arene polymer end blocks and at least one elastomeric conjugated diene polymer midblock. The number of blocks in the block copolymer is not of special importance, and the molecular configuration can be linear, graft, radical or star depending upon the method by which the copolymer is formed. Block copolymers having end blocks of styrene and midblocks of butadiene or isoprene are preferred. Such block copolymers are available under the tradenames of "Finaprene TM" and Kraton TM." The elastomers can be mixtures of the above polymers and copolymers.

The preferred acrylamide is dimethylaminopropylmethacrylamide (DMAPMA), that is a compound of the of the formula $CH_2=C(CH_3)C(O)N(H)(CH_2)_3N(CH_3)_2$. A preferred CMA contains, based on the asphalt content, from about 0.5 to about 35 weight percent styrene, from about 0.2 to about 15 weight percent DMAPMA, and from about 0.5 to about 30 weight percent elastomer.

Another CMA is a mixture of asphalt and polymer-amide blend. Desirably, the polymer-amide blend is from about 1 to about 50 weight percent of the blend of asphalt and the polymer-amide, while the asphalt is from about 99 to about 50 weight. Preferably, the compositions will contain from about 2 to about 10 weight percent of polymer-amide blend and from about 98 to about 90 weight percent of asphalts. These are disclosed in U.S. Pat. No. 5,019,610, which is hereby incorporated by reference.

The polymers used in the polymer-amide blend are commercially available thermoplastic rubber polymers. A thermoplastic polymer is one that softens and flows when exposed to heat, and returns to its original consistency when cooled. The polymers are desirably linear, diblock, triblock or radial structure. A triblock thermoplastic elastomer is desirably defined as a rubber copolymer having an elastomeric center block and a thermoplastic block on each end. Desirably, the thermoplastic block has a glass transition temperature well above room temperature. The resultant polymer desirably separates into two phases, a first phase being the thermoplastic block such as styrene, and the second phase being of the rubbery midblock, usually polyisoprene, poly(ethylenebutylene), polybutadiene or the like. The physical crosslinking and reinforcing properties of the polystyrene domains provide these polymers with high tensile strength whereas the rubber midblocks provide elasticity.

These polymers can desirably be Kraton TM thermoplastic rubbers including those with unsaturated rubber and saturated olefin rubber midblocks. They can also be Elvax TM, a thermoplastic ethylene-vinyl acetate copolymer.

The amide component of the polymer-amide blend can be fatty dialkyl amide capable of dissolving the specific polymer selected. The fatty dialkyl amides preferred have the general structure:

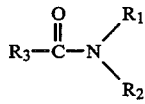

wherein:

$R_1$ and $R_2$ are the same or different moieties and are selected from $C_1$-$C_8$ alkyl groups; and $R_3$ is a $C_6$-$C_{22}$ alkyl group.

The blend of dialkyl amide and polymer is prepared by mixing the two ingredients together and heating, with occasional stirring, until blended and homogeneous.

Although it is preferred that the polymer be dissolved in the fatty dialkyl amide, it has also been found in conjunction with the present invention that the addition of fatty dialkyl amides alone to asphalt serves to facilitate dissolution of polymer added independently to the fatty dialkyl amide.

The polymer-amide blend will ordinarily contain from about 10 percent to about 75 percent by weight of polymer and from about 90 percent to about 25 percent by weight of one or more fatty dialkyl amides. Preferably, the blend will contain from about 40 percent to about 60 percent by weight of polymer and from about 60 percent to about 40 percent by weight of dialkyl amide. Most preferred is a 50:50 blend of polymer and amide.

The asphalt compound can also be physical blends of the above-described asphaltic materials with thermoplastics and elastomers including thermoplastic elastomers. Desirably, the blend is from about 80 to about 99, and preferably from about 88 to about 97 weight percent asphalt and from about 1 to about 20, and preferably from about 3 to about 12 weight percent thermoplastic or elastomer. Thermoplastic elastomers useful for this purpose include block copolymers of styrene-butadiene, styrene-butadiene-styrene, hydrogenated styrene-butadiene-styrene, styrene-isoprene-styrene, and other commercially available thermoplastic elastomers. Their tradenames include Kraton TM, Finaprene TM, Solprene TM, Europrene TM, and Calprene TM. Suitable traditional elastomers include styrene-butadiene rubber, acrylonitrile-butadiene rubber, butyl rubber, ethylenepropylene rubber, and ethylene-propylene-diene terpolymers. Suitable thermoplastics include polypropylene, ethylene-vinyl acetate copolymers, and other polyolefins.

The asphalt can be a chemically modified asphalt, desirably a rubber modified asphalt such as one made by the technology disclosed in the French Patent publication 2 376 188, deposited December 28, 1976, as application number 76 39233. This technology involves mixing from 80 to 98 parts by weight of almost any asphalt with 2 to 20 parts by weight of rubbery polymers. These rubbery polymers include polyisoprene, butyl rubber, polybutenes, ethylene-propylene rubber, poly(styrene-butadiene), poly(ethylene-vinyl acetate), etc. These polymers can be random or blocky and have molecular weights form 30,000 to 300,000. The mixing is done to obtain homogeneous blends at 130° to 230° C. Once the blend is homogeneous, 0.1 to 3 parts sulfur is added per each 100 parts by weight of asphalt. Mixing continues for 20 minutes to 5 hours during which time the sulfur crosslinks the rubbery polymer. The preferred rubbery polymer is poly(styrene-butadiene) with 40–80 weight percent butadiene and 20–60 weight percent styrene. This polymer is known to be easily crosslinked with sulfur at these temperature and under these mixing conditions. The crosslinking reactions can be between the polymer and itself or between the polymer and the asphalt. Other crosslinking agents and additives such as peroxides, metal oxides, etc., may be used in place of the sulfur for the crosslinking reactions outside of the technology of the above-mentioned French patent publication.

The asphalt, asphalt polymer blend or chemically modified asphalt (CMA) may be incorporated into an emulsion by heating the asphaltic compound to from 200° to 400° F. (93°–204° C.), and preferably from 225° to 325° F. (107°–162° C.). The copolymeric emulsifier and any optional water dispersible additives are added to the water phase. This solution of emulsifier is maintained at from ambient to 180° F. (25°–83° C.), preferably at 100°–125° F. (38°–52° C.). The asphalt, asphalt polymer blend, or CMA and the emulsifier solution are then blended together in a high shear environment to obtain the desired emulsion. The high shear can be provided by a colloid mill in a continuous process, or by a high-speed disperser or homogenizer in a batch process.

The asphaltic emulsions made with the copolymeric anionic emulsifiers can have their pH adjusted with a variety of basic compounds including alkaline metal hydroxides, oxides, or carbonates; ammonia, and basic organic amines. The preferred alkaline metals are sodium and potassium. The basis organic amines, if they have less than 6 carbon atoms, can serve as merely pH neutralizing agents. If they have 6 or more carbon atoms, they can also impart improved water resistance to the cured asphalt derived from the asphaltic emulsions. Examples of basic organic amines include short chain compounds such as triethylamine, amino-alcohols such as triethanolamine or 2-amino-2-methyl-1- propanol; higher molecular weight compounds such as long chain alkyl amines, alicyclic alkylamines, ethoxylated amines, ethoxylated alkylated amines, ethoxylated fatty acid amines, fatty acid amines and combinations thereof. These basic organic amines can desirably have from about 2 to about 50 carbon atoms. The highest molecular weight amines are the ethoxylated types that can desirably have about 10 to 20 ethoxy units per molecule.

The organic amines include aliphatic primary, secondary, tertiary amines; quaternary amine hydroxides; and alkylene oxide treated amines. Said aliphatic groups can be linear or branched and desirably have up to 12 or more carbon atoms. A preferred organic amine is the compound below where the sum of x and y equals about 15.

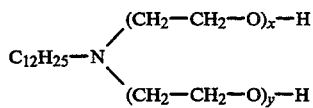

The particle size of the emulsions which may be used is not particularly critical. Generally, the average particle size will range from between 0.5 microns to 100 microns in diameter. It is preferred to use an emulsion having a particle size of less than 10 microns.

These asphaltic emulsions have a variety of uses wherever asphalt compounds are used. Such uses include sealants, mastics, and water-based coatings in a variety of residential and commercial buildings and facilities. Such uses include waterproof coatings, basement coatings, damp-proof coatings, pavement coatings, roof coatings, and crack sealants. These emulsions can be applied by spraying, brushing and rolling. These emulsions can be used as adhesives for tiles, wood, plastics, metals, synthetic or non-synthetic insulation board or pile, and fabric coated or uncoated roofing. They can be used as a binder for aggregates in asphalt pavement, cements, and patches. They can be used as an adherent for asphalt-based membrane or a fiberglass nonwoven mat.

The above copolymeric emulsifiers should be compatible with anionic or cationic emulsifiers and nonionic emulsifiers. The commercially available anionic, cationic and nonionic emulsifiers are well known to the art. The asphalt, asphalt polymer blend, or CMA emulsion may contain a mixture of the above described polymeric emulsifier and the commercially available non-polymeric anionic, cationic and/or polymeric nonionic emulsifiers. These non-polymeric emulsifiers and nonionic polymeric emulsifiers may comprise up to 2 weight percent of the emulsion, desirably only up to 0.5 weight percent of the emulsion, and preferably 0 wt. % or only up to 0.1 weight percent of the emulsion. Desirably, the emulsifiers other than the copolymeric emulsifiers of this invention are post added to the emulsion after it is formed.

Polymer latices can also be added to these asphaltic emulsions at the colloid mill head or disperser while the emulsion is being formed, or as a post addition after the emulsion is formed. The latices can be any common emulsion polymerized polymer supplied in latex form. These polymers generally have a glass transition temperature below 0° C., imparting low temperature properties to the cured asphaltic film and often elastomeric properties as well, depending on the polymer and the amount used. Typical examples of latices used for asphalt modification are SBR's, acrylics, ethylene-vinyl acetate copolymers, and neoprenes. These polymer latices can be added from about 1 to 25 parts by weight per 100 parts by weight of asphalt emulsion.

The asphaltic emulsions of this invention can include small amounts of biocides (antimicrobials) to prevent the growth of fungi, bacteria, or other harmful species that may degrade or destabilize the asphaltic emulsion during storage or that may grow on the cured asphaltic product. Desirably these are included in amounts from about 0.025 to about 1.0 wt. % of the emulsion. Examples of these biocides, which include bactericides and fungicides are Busan TM 1024 (1-methyl-3,5,7-triaza-1-azoniatricyclo-[3.3.1.$^{3,7}$]decane-chloride), Cosan TM 91(2-hydroxymethylaminopropanol), and Nuocide TM 404-D (Chlorothaloniltetrachloroisophthalonitrile).

During processing and emulsification of the asphaltic emulsion, it may be desirable to add defoamers to limit air entrainment and foam. These products are used in trace amounts and are well known to the art. Two commercial defoamer examples are Surfynol ® 104E from Air Products & Chemicals, Inc. and Nopco TM NXZ from Henkel Corp.

Various organic and inorganic fillers may be added to increase the toughness, give better weathering and wear resistance, and give better wash off resistance to the composition. These fillers can also modify the flow and theology of the emulsions to desired ranges. Hydrocarbons in the form of oils, resins, and resin dispersions can be added to the composition to impart greater tack and adherence. Chemical modifiers may be added to change the cure rate, stabilize one or more components against environmental effects, or chemically modify the asphalt or any other polymeric or non polymeric components of the composition. These include antioxidants, antiozonants, cure accelerators, driers, etc. Corrosion inhibitors may be added if the composition will be in contact with surfaces which are subject to corrosion.

Fibers (for example, natural and synthetic) can be added to increase the toughness of the dried asphaltic compositions or to change the rheology, flow, and sag characteristics of the emulsions. Aluminum or other metal pigments can be added to increase the reflectivity of the dried asphaltic compositions or to modify the flow and physical properties of the asphaltic compositions. Fire retardants such as metal hydrates, metal hydroxides, halogenated compounds, and phosphorus compounds can be added to reduce the ability of asphaltic compositions to be ignited or support combustion.

The following examples show how various asphalt-based compounds can be made into asphalt emulsions with polymers made from carboxylic acid monomers.

The copolymeric emulsifiers from carboxylic acid monomers are commercially available in powder or liquid form. In powder form, they should be added to rapidly stirred water. The copolymers desirably are given sufficient opportunity to dissolve. These polymers being polyelectrolytes adopt different conformations in the water as the pH is changed. They have lower viscosities at pH values of about 3 and higher viscosities from about pH 4 to 13. In the acid form, the polyelectrolyte is in a more tightly coiled polymer conformation than when the carboxylic acid moieties are partially neutralized. The emulsifier in water solutions are then desirably heated from about 100° to about 140° F. (38°–60° C.). The asphalt-based compounds are desirably heated from 200°–325° F. (93°–162° C.) bringing them to a pumpable state.

The two components were then metered and pumped to the mill portion of the equipment. With CMA, elastomer modified asphalts, or blown asphalts which have higher viscosities, the asphalt component is heated to a higher temperature to lower the viscosity. Depending on the mix ratio, this may cause the final emulsion to leave the colloid mill above the boiling point of water. This results in pressure surges, irregular output, and unstable product. In these circumstances, a heat exchanger is installed at the output of the mill to cool the product below the boiling point of water. The viscosity at this point is partly controlled by the pH of the solution. Desirably, the emulsification is done at a pH around 3, where the viscosity is lowest. As previously explained, at higher pH values, the viscosity of the emulsifier in water is increased. A basic compound such as 2-amino-2-methyl-propanol (AMP 95) can be added to change the pH and increase the viscosity of the emulsion. As previously mentioned, if the cured asphalt composition is to be subjected to exposure to moisture or water after cure, then an organic amine having more than 6 carbon atoms may improve resistance to water.

EXAMPLES

In the following illustrative examples, the amounts of each ingredient is given in weight percent based on the total weight of asphalt emulsion unless noted otherwise.

The Carbopol ® and water were mixed and heated; the asphalt component was heated to reduce the viscosity; then they were shear blended in a colloid mill; any pH adjustment was done first with alkaline metal hydroxides, oxides, and carbonates or amines with less than 6 carbon atoms, and then with the amines having 6 or more carbon atoms while stirring; and then any filler or fibers were added with shear.

EXAMPLE RECIPE 1

| | |
|---|---|
| Asphalt 100 penetration | 61.81% |
| Water | 38.00% |
| Carbopol ® 1622[a] | 0.19% |

Properties: pH 3.0. Viscosity - Brookfield RV, #1 Spindle, 20 RPM, 200 cPs.
[a]Carbopol ® 1622 is a copolymeric anionic emulsifier within the description of this invention having carboxylic acid groups.

EXAMPLE RECIPE 2

| | |
|---|---|
| Asphalt 100 penetration | 61.67% |
| Water | 37.92% |
| Carbopol ® 1622 | 0.19% |
| 2-Amino-2-methyl-1-propanol (AMP95)[b] | 0.14% |
| Ethoxylated Amine, Ethomeen ® C/25A (Akzo Chemicals Inc.) | 0.08% |

Properties: pH 6.5. Viscosity - Brookfield RV, #3 Spindle, 20 RPM, 2,365 cPs. Product is smooth and homogeneous. Sample retained homogeneity after being subjected to 16 freeze-thaw cycles
[b]Ethomeen ® C/25A has the formula RN(EO)$_x$H(EO)$_y$H where R = Coco alkyls.

EXAMPLE RECIPE 3

| | |
|---|---|
| Asphalt 100 penetration | 61.73% |
| Water | 37.95% |
| Carbopol ® 1622 | 0.19% |
| KOH, 45% | 0.10% |
| Alicyclic Fatty Acid Alkylamine[c] | 0.03% |

EXAMPLE RECIPE 3 -continued

| | |
|---|---|
| Redicote ® 1-43 (Akzo Chemicals Inc.) | |

Properties: pH 6.0. Viscosity - Brookfield RV, #3 Spindle, 20 RPM, 2,910 cPs. Product is smooth and homogeneous. Sample retained homogeneity after being subjected to 19 freeze-thaw cycles.
[c]Redicote ® I-43 is 50 wt. % cationic surfactant in 50 wt. % petroleum distillate. The cationic surfactant is proprietary. It is a product of Akzo Chemie America.

EXAMPLE RECIPE 4

| | |
|---|---|
| Asphalt 100 Penetration | 74.75% |
| Water | 25.00% |
| Carbopol ® 1622 | 0.25% |

Properties: pH 3.1. Viscosity - Brookfield RV, #6 Spindle, 2.5 RPM, 4,500 cPs.

EXAMPLE RECIPE 5

| | |
|---|---|
| Asphalt 100 Penetration | 74.61% |
| Water | 24.95% |
| Carbopol ® 1622 | 0.25% |
| 2-Amino-2-methyl-1-propanol | 0.12% |
| Ethoxylated Amine, Ethomeen ® C/25A | 0.07% |

Properties: pH 5.5. Viscosity - Brookfield RV, #7 Spindle, 2.5 RPM, 420,000 cPs. Product appears somewhat grainy.

EXAMPLE RECIPE 6

| | |
|---|---|
| Asphalt 50/60 Penetration | 64.64% |
| Water | 34.95% |
| Carbopol ® 1622 | 0.26% |
| 2-Amino-2-methyl-1-propanol | 0.11% |
| Ethoxylated Amine, Ethomeen ® C/25A | 0.04% |

Properties: pH 6.5. Viscosity - Brookfield RV, #7 Spindle, 2.5 RPM, 186,500 cPs. Product is smooth and homogeneous.

EXAMPLE RECIPE 7

| | |
|---|---|
| Asphalt 50/60 Penetration | 64.63% |
| Water | 34.94% |
| Carbopol ® 1622 | 0.26% |
| 2-Amino-2-methyl-1-propanol | 0.11% |
| Fatty Acid Amine Blend, ACRA-500[d] (Exxon Chemical, Tomah Products) | 0.06% |

Properties: pH 6.5. Viscosity - Brookfield RV, #7 Spindle, 2.5 RPM, 95,000 cPs. Product is smooth and homogeneous.
[d]ACRA 500 is proprietary to Exxon Chemical and contains fatty amines and aminoethyl piperazine.

EXAMPLE RECIPE 8

| | |
|---|---|
| Asphalt 50/60 Penetration | 64.60% |
| Water | 34.93% |
| Carbopol ® 1622 | 0.27% |
| 2-Amino-2-methyl-1-propanol | 0.13% |
| Alicyclic Fatty Acid Alkylamine, Redicote ® 1-43 | 0.07% |

Properties: pH 6.5. Viscosity - Brookfield RV, #7 Spindle, 2.5 RPM, 55,000 cPs. Product is smooth and homogeneous.

EXAMPLE RECIPE 9

| | |
|---|---|
| Asphalt 100 Penetration blended 3% Triblock SBS and 3% Diblock SBS | 49.25% |
| Water | 50.0% |
| Carbopol ® 1622 | 0.75% |

Properties: pH 3.0. Viscosity - Brookfield RV, #3 Spindle, 2.5 RPM, 14,000 cPs.

| EXAMPLE RECIPE 10 | |
|---|---|
| Asphalt 100 Penetration blended with 3% Triblock styrene-butadiene-styrene and 3% Diblock styrene-butadiene | 49.02% |
| Water | 49.76% |
| Carbopol 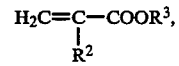 1622 | 0.75% |
| 2-Amino-2-methyl-1-propanol | 0.30% |
| Ethoxylated Amine, Ethomeen ® C/25A | 0.17% |

Properties: pH 5.5. Viscosity - Brookfield RV, #7 Spindle, 2.5 RPM, 96,000 cPs. Product is smooth and homogeneous.

| EXAMPLE RECIPE 11 | |
|---|---|
| Asphalt 50/60 Penetration | 61.27% |
| Water | 33.13% |
| Carbopol ® 1622 | 0.25% |
| 2-Amino-2-methyl-1-propanol | 0.10% |
| Ethoxylated Amine, Ethomeen ® C/25A | 0.04% |
| Glass Spheres, Zeospheres ™ -850 | 4.74% |
| Polyolefin Fiber, Minifiber ™ 38F | 0.47% |

Properties: Filler and fiber dispersed well within the emulsion.

Carbopol 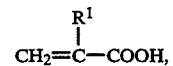 1622 is an acrylic acid copolymer produced by BFGoodrich that falls within the definitions of the copolymeric anionic emulsifiers of this disclosure. The emulsions were thixotropic, homogeneous, smooth and had a desirable particle size distributions. Example Recipe 2 (8 oz. sample) was tested for freeze-thaw stability by freezing and thawing the sample. Each cycle consisted of going from ambient temperature to 0° F. (−18° C.) for a minimum period of 24 hours. Then the emulsion was warmed by allowing to stand over a period of 12 to 24 hours at ambient temperatures before the next cycle began. This emulsion using the copolymeric anionic emulsifiers retained homogeneity after being subjected to 16 freeze-thaw cycles. This is dramatically different than emulsions made from traditional emulsifiers which break on the first freeze-thaw cycle and are not redispersible by simple mixing. Other emulsions using the emulsifier of this invention also showed good freeze-thaw stability.

The asphaltic emulsions of Example Recipes 1–11 were applied and cured as coatings. These materials have good thixotropy characteristics, allowing easy application but resistant to flow and deformation under low shear. Example recipes 2, 3, and 5–10 were tested as protective coatings by ASTM D2939-78, Volume 04.04 for resistance to water. These coatings, when cured for 48 hours at room temperature and then subjected to water immersion, showed no tendency to re-emulsification, and retained their physical integrity and adhesion to the substrate. The resistance to water is a necessary property for coatings used in roofing and waterproofing applications.

While in accordance with the Patent Statutes, the best mode and preferred embodiment has been set forth, the scope of the invention is not limited thereto, but rather by the scope of the attached claims.

What is claimed is:

1. An asphalt emulsion comprising:
   a) about 20 to about 80 weight percent of asphalt, asphalt-polymer blend, or chemically modified asphalt,
   b) about 20 to about 80 weight percent water, and
   c) about 0.05 to about 7 weight percent of one or more copolymeric emulsifiers, said emulsifiers made from at least 50 weight percent of one or more carboxylic acid monomers; from 1 to 50 weight percent of one or more acrylate monomers of the formula, $$H_2C=C-COOR^3,$$
$$\phantom{H_2C=C-}|$$
$$\phantom{H_2C=C-}R^2$$

$R^2$ being hydrogen, $CH_3$ or $C_2H_5$ while $R^3$ is an alkyl group having from 10 to 30 carbon atoms; up to 6 weight percent crosslinking monomers; and optionally other olefinic monomers,
said weight percents of a, b, and c being based on 100 parts by weight of said a, b, and c.

2. An asphalt emulsion according to claim 1, wherein the asphalt, asphalt-polymer blends or chemical modified asphalt is present from above 50 weight percent to about 80 weight percent and said water is present from about 20 to about 50 weight percent.

3. An asphalt emulsion according to claim 2, wherein the copolymeric emulsifier is present from 0.1 to 2 wt. % and is a copolymer of from about 70 to about 99 weight percent carboxylic acid monomers, from about 1 to about 30 weight percent of said acrylate monomers, and up to 6 weight percent of one or more crosslinking monomers, and wherein said asphalt emulsion includes one or more organic amines having six or more carbon atoms.

4. An asphalt emulsion according to claim 3, wherein the copolymeric emulsifiers are made from about 70 to about 98 weight percent carboxylic acid monomers, from about 2 to about 29.5 weight percent of said acrylate monomers, and from about 0.1 to about 4 weight percent crosslinking monomers.

5. An asphalt emulsion according to claim 4, wherein said one or more copolymeric emulsifiers are each made from said carboxylic acid monomers, said acrylate monomers, and said crosslinking monomers, and wherein said carboxylic acid monomers have the formula $$\begin{array}{c} R^1 \\ | \\ CH_2=C-COOH, \end{array}$$

wherein $R^1$ is selected from the group consisting of H, $CH_3$, and $C_2H_5$.

6. An asphalt emulsion according to claim 4, wherein the weight percent asphalt is from about 60 to about 80.

7. A coating comprising an asphalt emulsion according to claim 1.

8. An asphalt emulsion according to claim 1, including natural or synthetic fibers, an inorganic or organic filler, and optionally a fire retardant.

9. An asphalt emulsion according to claim 1, including aggregates.

10. A coating comprising an asphalt emulsion according to claim 1, including natural or synthetic fibers, an inorganic or organic filler, and optionally a hydrocarbon process oil and/or a fire retardant.

11. A coating according to claim 10, including aluminum pigments.

12. A coating comprising an asphalt emulsion according to claim 1, including corrosion inhibitors.

13. An asphalt emulsion according to claim 3, including natural or synthetic fibers, an inorganic or organic filler, and optionally a fire retardant.

14. An asphalt emulsion according to claim 3, including aggregates.

15. A coating comprising an asphalt emulsion according to claim 3, including natural or synthetic fibers, an inorganic or organic filler, and optionally a hydrocarbon process oil and/or a fire retardant.

16. A coating according to claim 15, including aluminum pigments.

17. A coating comprising asphalt emulsion according to claim 3, including corrosion inhibitors.

18. An asphalt emulsion according to claim 5, including natural or synthetic fibers, an inorganic or organic filler, and optionally a fire retardant.

19. An asphalt emulsion according to claim 5, including natural or synthetic fibers, an inorganic or organic filler, and optionally a hydrocarbon process oil and/or a fire retardant.

20. A coating comprising an asphalt emulsion according to claim 19, including aluminum pigments.

21. A coating comprising an asphalt emulsion according to claim 5, including corrosion inhibitors.

22. An asphalt emulsion according to claim 3, which is mixed with a polymeric latex.

23. An asphalt emulsion according to claim 5, which is mixed with a polymeric latex.

24. A coating comprising an asphalt emulsion according to claim 23, including natural or synthetic fibers, an inorganic or organic filler, and optionally a fire retardant.

25. An asphalt emulsion according to claim 5, wherein said crosslinking monomer is allyl pentaerythritol, trimethylolpropane diallyl ether, or allyl sucrose, or combinations thereof.

26. In a process for forming emulsions of asphalt and water, the improvement comprising utilizing copolymeric emulsifier in amounts of from 0.50 to 7 wt. % of said emulsions, said copolymeric emulsifier being polymerized from monomers comprising at least 70 wt. % of one or more carboxylic acid monomers; from 2 to 29.5 wt. % acrylate monomers of the formula $$H_2C=\underset{R^2}{\overset{|}{C}}-COOR^3,$$

$R^2$ being H, $CH_3$, or $C_2H_5$ while $R^3$ is an alkyl group having from 10 to 30 carbon atoms; and from about 0.1 to 4 wt. % crosslinking monomers having at least two unsaturated carbon-to-carbon double bonds, each of which is capable of being copolymerized with the carboxylic acid monomers.

27. In a process according to claim 26, wherein said one or more carboxylic acid monomers have at least one activated carbon-to-carbon double bond, at least one carboxylic acid group, and 3 to 20 carbon atoms.

* * * * *